(12) United States Patent
Shrum, Jr. et al.

(10) Patent No.: US 8,782,228 B2
(45) Date of Patent: Jul. 15, 2014

(54) SIDE LOADING

(75) Inventors: Edgar V. Shrum, Jr., Smyrna, GA (US); Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 266 days.

(21) Appl. No.: 13/332,359

(22) Filed: Dec. 20, 2011

(65) Prior Publication Data

US 2012/0090020 A1    Apr. 12, 2012

Related U.S. Application Data

(62) Division of application No. 12/767,569, filed on Apr. 26, 2010, now Pat. No. 8,380,878.

(60) Provisional application No. 61/233,674, filed on Aug. 13, 2009.

(51) Int. Cl.
*G06F 15/16* (2006.01)
*G06F 12/00* (2006.01)

(52) U.S. Cl.
USPC .......................................................... 709/225

(58) Field of Classification Search
USPC ............... 709/203, 217–218, 223–229, 250
See application file for complete search history.

(56) References Cited

U.S. PATENT DOCUMENTS

| | | | |
|---|---|---|---|
| 7,721,204 B2 | 5/2010 | Eschbach et al. | |
| 7,979,550 B2 | 7/2011 | Xiao et al. | |
| 8,380,878 B2 * | 2/2013 | Shrum et al. | 709/246 |
| 2003/0163427 A1 * | 8/2003 | Fung et al. | 705/51 |
| 2005/0265395 A1 | 12/2005 | Kim et al. | |
| 2007/0089167 A1 * | 4/2007 | Villavicencio | 726/5 |
| 2007/0226365 A1 | 9/2007 | Hildreth et al. | |
| 2008/0133364 A1 * | 6/2008 | Ullah | 705/14 |
| 2009/0019492 A1 | 1/2009 | Grasset | |
| 2009/0026657 A1 | 1/2009 | Nimmakayala et al. | |
| 2009/0296657 A1 | 12/2009 | Omar et al. | |
| 2010/0111101 A1 * | 5/2010 | McKee et al. | 370/466 |
| 2010/0146146 A1 | 6/2010 | Welts et al. | |
| 2010/0257236 A1 | 10/2010 | Agnoli et al. | |
| 2010/0306411 A1 | 12/2010 | Zhang et al. | |
| 2012/0029897 A1 | 2/2012 | Cherian et al. | |
| 2012/0086851 A1 | 4/2012 | Shrum, Jr. et al. | |
| 2013/0219056 A1 | 8/2013 | Mikan et al. | |

OTHER PUBLICATIONS

Notice of Allowance mailed Jan. 9, 2013, in co-pending U.S. Appl. No. 12/767,569.
Office Action issued Apr. 9, 2012, in co-pending U.S. Appl. No. 12/767,569.
Notice of Allowance mailed Feb. 7, 2014, in co-pending U.S. Appl. No. 13/332,356.

* cited by examiner

*Primary Examiner* — Zarni Maung
(74) *Attorney, Agent, or Firm* — Merchant & Gould P.C.

(57) ABSTRACT

Side loading of content elements is provided. A selection of a content element from a terminal device may be received and a content format associated with the terminal device may be identified. If the content element is not available in the identified content format, the content element may be transcoded from a current content format to the identified content format and the content element may be transferred to the terminal device in the identified content format.

20 Claims, 5 Drawing Sheets

SIDE LOADING

RELATED APPLICATIONS

This application is a divisional of U.S. application Ser. No. 12/767,569, filed Apr. 26, 2010, which claims the benefit of U.S. Provisional Application No. 61/233,674, filed Aug. 13, 2009, which are incorporated herein by reference.

This application is also related to co-pending U.S. application Ser. No. 13/332,356, filed Dec. 20, 2011, titled SIDE LOADING, which is incorporated herein by reference.

BACKGROUND

Side loading is a process for providing network delivery of content. In some situations, service providers need to provide access to various devices in order for those devices to consume media content. For example, a portable video player may download a movie from an online retailer in a specific, known format. This conventional strategy requires the service provider to transmit media in a format that is known to be compatible with the specific device in question. This often causes problems because the conventional strategy does not allow the service provider to interact with other devices that may use different formats. For example, service providers have no way to determine what formats a device may be able to consume, and may have a small number of formats they can provide. This may limit the number of devices service providers may allow consumers to use with their provided media.

SUMMARY

Consistent with embodiments of the present invention, systems and methods are disclosed for side loading. A selection of a content element from a terminal device may be received and a content format associated with the terminal device may be identified. If the content element is not available in the identified content format, the content element may be transcoded from a current content format to the identified content format, and the content element may be transferred to the terminal device in the identified content format.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Figure 1:
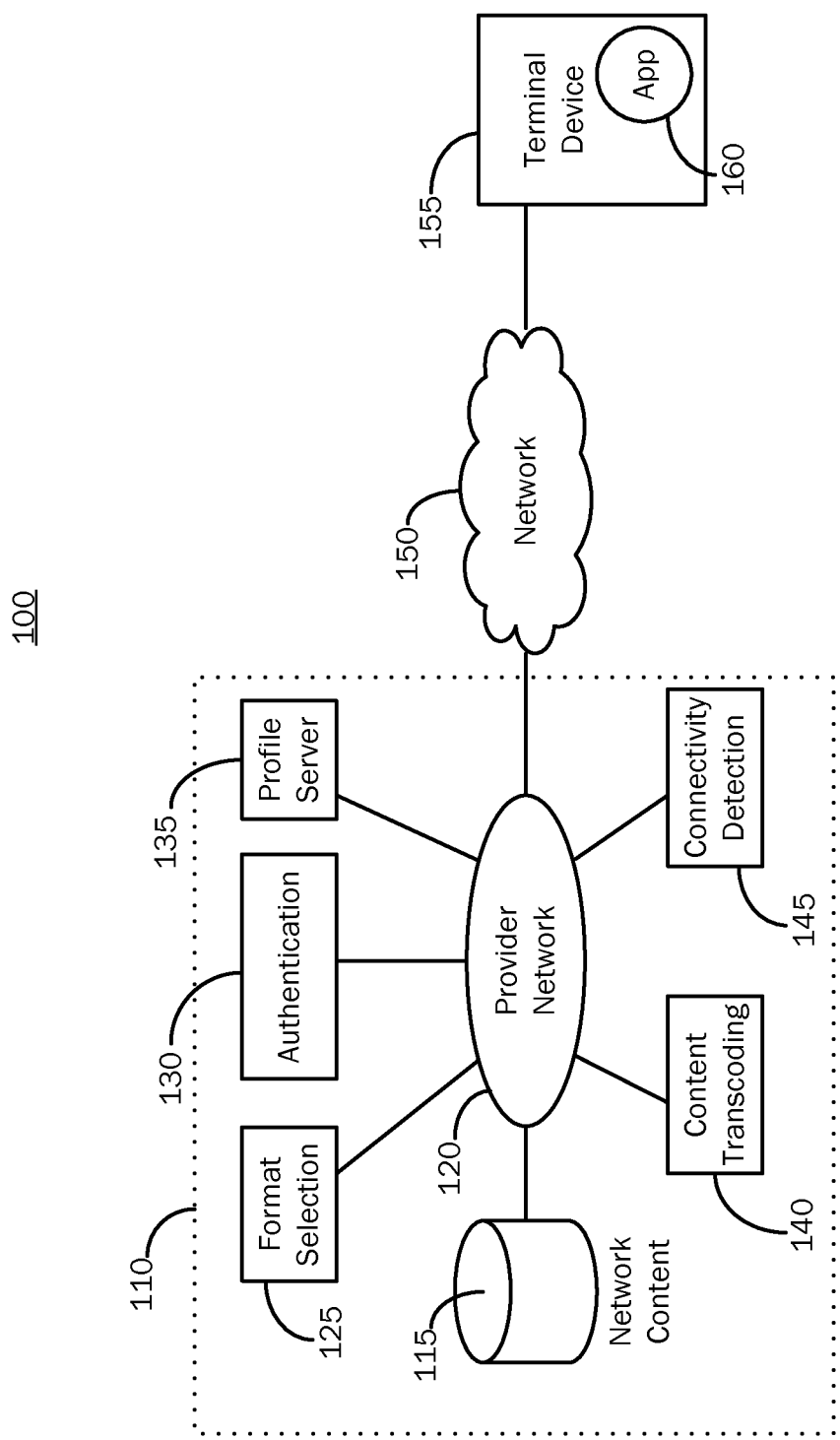
FIG. 1 is a block diagram illustrating a service provider architecture.

Embodiments of the present invention provide for a method of enabling the ability to transfer content (e.g., video, audio, etc.) stored in a home or in a service provider network to a mobile or other type of customer premises equipment (CPE) device. A CPE device may comprise telecommunications hardware located at the home or business of a customer while mobile devices may be operative to be relocated and may connect to other networks outside the customer premises (e.g., at a WiFi hot spot). Such equipment may include cable or satellite television set-top boxes, handheld game consoles, portable media players, tablet and/or notebook computers, and/or cellular telephones. A system utilizing embodiments of the present invention may support a CPE device that may be connected to multiple networks (e.g., home LAN and Access WAN) concurrently or the connection type may vary over time/location of the device.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Consistent with embodiments of the invention, a user may be enabled to create rules for how and when content is transferred. Rules that may be created include, but are not limited to when transfers of content should take place (e.g., only at night), over what networks transfers should take place (e.g., only when connected via WiFi), and/or download preferences (e.g., willing to sacrifice content quality to have faster download times).

Further consistent with embodiments of the invention, a content owner/service provider may be enabled to set usage rules for various content. Such usage rules may include, but are not limited to, what content is eligible for transfers to authorized terminal devices, what content is eligible for transfers that does not require any authorization, what content requires secure transfer and storage (e.g., encryption), and/or how and when content may be consumed on a terminal device (e.g., duration of rental windows, restriction by geographic location, etc.). Rules, whether user or provider created, may be tied to a current network access a device is utilizing. Based on the access type or available throughput, an appropriate content format may be selected.

Existing home networking protocols may be augmented for device and content discovery and link protection (e.g., DLNA, UPnP, DTCP/IP) with a higher layer application that provides more robust device/application preferences, authentication, and content usage and downloading rules.

FIG. 1 is simplified block diagram illustrating a service architecture 100 that may comprise an operating environment for a media service provider. Service architecture 100 may comprise a service provider 110 comprising a network content store 115 connected to a provider network 120. Provider network 120 may be in further connection with a plurality of components/modules operative to provide functionality for distributing and/or transferring content from network content store 115. The modules may comprise separate hardware components (e.g., computing devices) and/or software modules executing on a computing device configured to implement embodiments of the invention such as that described below with respect to FIG. 5. The modules may comprise a format selection module 125, a device/application authentication module 130, a profile server 135, a content transcoding module 140, and/or a connectivity detection module 145. Provider network may be operative to connect to a terminal device 155 over a network 150.

Profile server 135 may be operable for storing user and/or device information, such as device compatibility lists and/or user permissions and/or preference data. Connectivity detection module 145 may be operable for detecting what network terminal device 155 is connected to, as well as an available transfer rate to terminal device 155. This may be performed at device connection time, session establishment, and/or during the course of a session. Format selection module 125 may be operable for selecting an appropriate format for a requested content to be transferred in (e.g., what video profile, bit rate, resolution, etc.) based on rules stored on profile server 135 and information gathered by connectivity detection module 145. Content transcoding module 140 may be operable for performing a transformation function between content media formats as directed by format selection module 125. Authentication module 130 may be operable for authenticating and authorizing devices or applications to gain access to restricted content. A trusted application (app) 160 may be an application that may reside on a device, such as terminal device 155, operable for ensuring content usage rules are enforced. Not all content may require trusted application 160 to be present for it to be transferred to a device. Network 150 may comprise a private network, such as a cable television distribution network and/or a cellular data network and/or a public network such as a metropolitan WiMAX network and/or the Internet. A rules engine may also be provided that may match content formats to device profiles, such as those stored in profile server 135. The rules engine may comprise a separate server (not shown) and/or may be incorporated as a software module in another element of service architecture 100.

Figure 2:
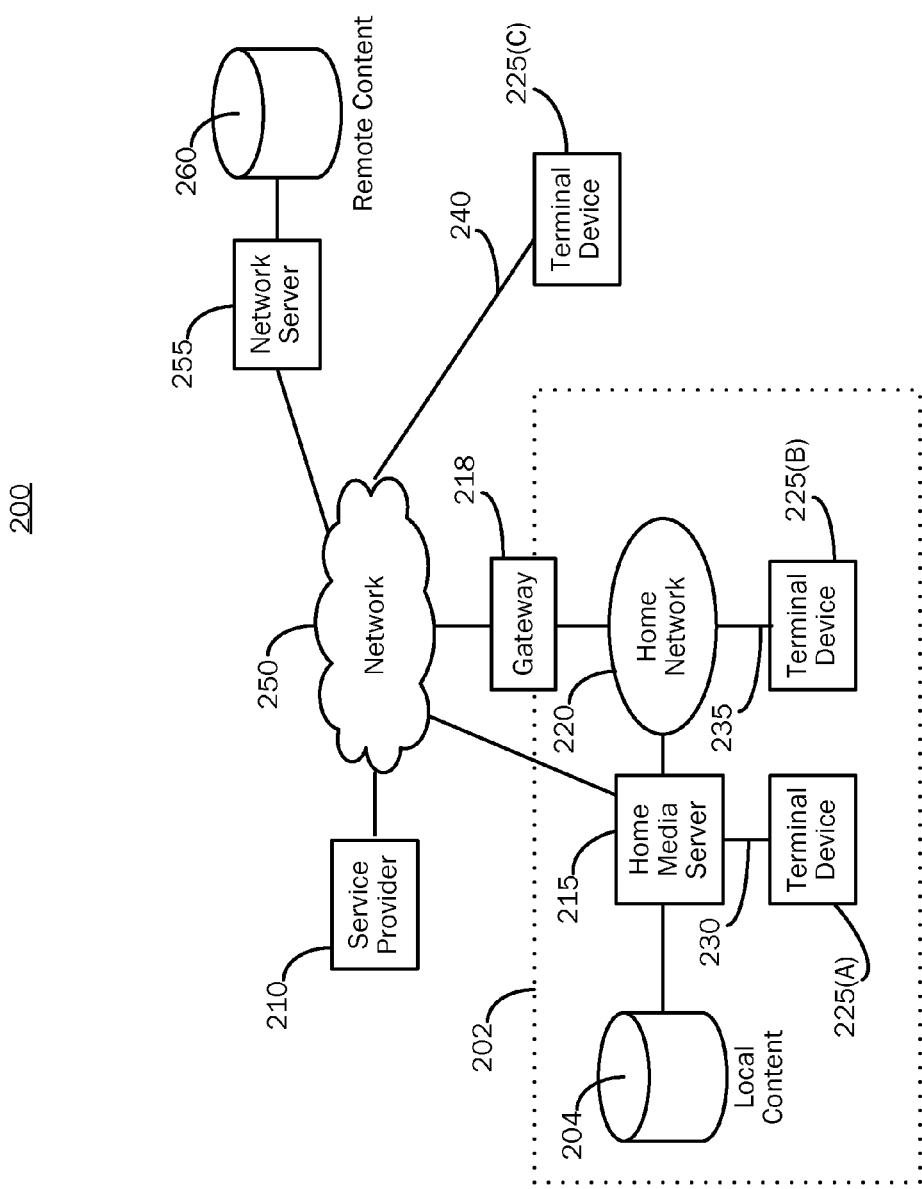
FIG. 2 is a block diagram illustrating a customer premises architecture.

FIG. 2 is a block diagram illustrating a consumer architecture 200 comprising a customer premises 202. Components associated with customer premises 202 may communicate with service provider 210 over network 250. Customer premises 202 may comprise a home media server 215, a gateway 218, a home network 220, and a plurality of terminal devices 225(A)-225(C). Terminal device(s) 225(A)-225(C) may comprise portable devices that may be removed from customer premises 202 and operate in other locations, such as a laptop and/or a cellular phone. Each terminal device 225(A)-225(C) may communicate with home media server 215 and/or service provider 210. For example, terminal device 225(A) may communicate with home media server 215 via a physical link 230, such as a Universal Serial Bus (USB) cable, terminal device 225(B) may communicate with home media server 215 via link 235 home network 220, and terminal device 225(C) may communicate with service provider 210 via a public link (e.g., a cellular data network) 240 to network 250. Consistent with embodiments of the invention, terminal devices such as terminal device 225(C) may communicate with a network server 255 with access to a plurality of remote content 260 that may be located outside of service provider 210's premises. Terminal devices 225(A), 225(B) may also communicate with service provider 210 via gateway 218 between home network 220 and network 250, while terminal device 225(C) may be operable to communicate with home media server 215 via relays over public link 240, network 250, and/or home network 220. Gateway 218 may comprise a separate component and/or a network interface unit integrated into home media server 215. Terminal device 225(A)-225(C) may each and/or all be operative to connect directly to network 250, such as via a wireless networking interface on a laptop computer terminal device. Customer premises 202 may further comprise a local content store 204 in communication with home media server 215 and/or home network 220. For example, local content store may comprise a network attached storage device. Consistent with embodiments of the invention, functional modules shown as part of service architecture 100 of FIG. 1 may be distributed to and execute at customer premises 202.

Figure 3:
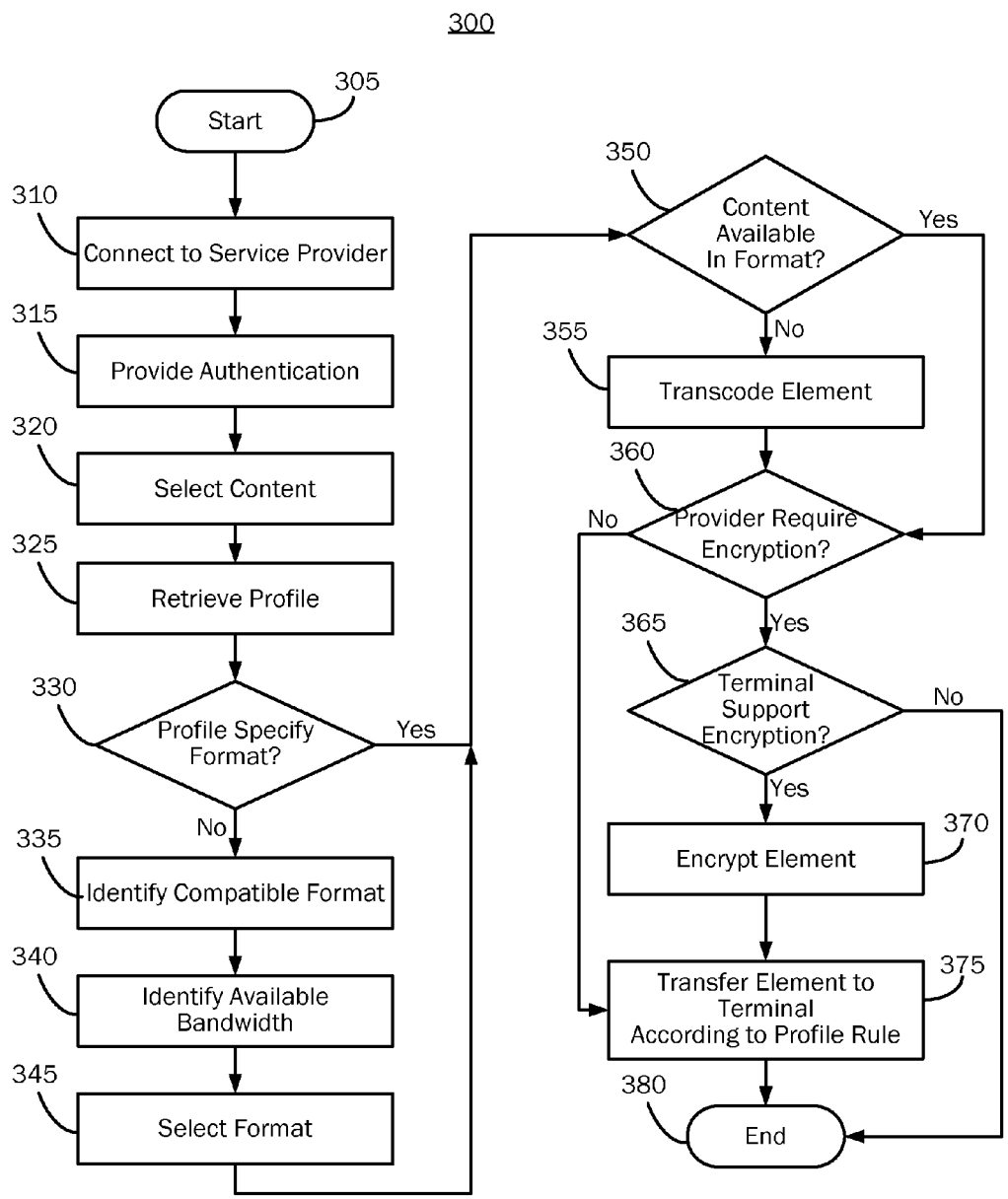
FIG. 3 is a flow chart showing an illustrative routine for providing side loading.

FIG. 3 is a flow chart setting forth the general stages involved in a method 300 consistent with embodiments of the invention for providing side loading. Method 300 may be implemented using a computing device 500 as described in more detail below with respect to FIG. 5. Ways to implement the stages of method 300 will be described in greater detail below. Method 300 may begin at starting block 305 and proceed to stage 310 where computing device 500 may connect to a service provider. For example, terminal device 155 may connect to provider network 120 over public network 150. Terminal device 155 may comprise, for example, a portable entertainment device, such as a handheld game unit or audio/video player, operable to connect to network 150 via a wireless network connection (e.g. 802.11) and/or a cellular network connection.

From stage 310, method 300 may advance to stage 315 where computing device 500 may provide authentication to the service provider. For example, terminal device 155 may submit a username and password associated with a user account with the service provider. Authentication module 130 may receive the authentication details, verify a status of the user account, and identify a plurality of content stored on network content store 115 that may be accessed by terminal device 155. If terminal device 155 does not have current and/or valid authentication credentials, the service provider may be operative to provide access to some and/or all of the content stored on network content store 115, such as a subset of free video programming and/or a list of content that may be ordered and/or purchased without an authenticated account. Consistent with embodiments of the invention, different customers associated with the service provider may have access to different content elements; these differences may be identified according to the authentication details. For example, one customer may have access to TV shows, while another customer has access to TV shows and movies.

From stage 315, method 300 may advance to stage 320 where computing device 500 may select a content element to be retrieved. For example, terminal device 155 may display the list of available content to a user of terminal device 155 and receive a selection from the list. Consistent with embodiments of the invention, terminal device 155 may submit a selection request comprising a specific piece of content (e.g., "episode 3 of season 12 of Lost"), an element of metadata associated with a piece of content (e.g., "the most recent episode of Lost"), and/or a search query (e.g., "Lost"). Such a search query may return a plurality of content elements for selection by terminal device 155. Terminal device 155 may be operative to select multiple content elements (e.g. "all episodes of Lost"). Content elements may comprise, but are not limited to, elements of electronic data such as audio/video streams and/or files, software applications (e.g., games), web pages, electronic documents, and/or messages (e.g., e-mail, text messages, service provider alerts, etc.).

After selecting at least one content element at stage 320, method 300 may advance to stage 325 where computing device 500 may retrieve a profile. For example, the profile may be associated with an owner of terminal device 155, a user of terminal device 155, a user associated with the service provider account authenticated in stage 315, and/or a profile associated with a type of terminal device. For example, the service provider may have a generic profile for any user connecting from a cellular phone, a profile for users of specific models of cellular phones or handheld game units, or users connecting over a specific carrier or type of network.

The profile may comprise rules that may be created by and/or for a user of terminal device 155 and/or rules created by the service provider.

From stage 325, method 300 may advance to stage 330 where computing device 500 may determine whether the profile specifies compatibility information associated with providing the content element, such as a video format. For example, the profile may comprise information indicating that terminal device 155 is operable to play videos associated with one and/or more codecs (e.g., MPEG-4), at one and/or more data rates, and/or at one and/or more resolutions. The profile and/or the content selection may comprise compatibility information indicating that an incompatible format is desired by a user of terminal device 155. For example, terminal device 155 may comprise a screen capable of displaying a max resolution of 320×240 pixels, but may comprise a High-Definition (HD) output port. Terminal device 155 may thus request an HD format instead of and/or in addition to a format compatible with its built-in screen. The request for the HD format may also comprise a user-specified rule associated with the profile.

The compatibility information may further comprise a bandwidth associated with terminal device 155. For example, a mobile video player may be capable of displaying HD movies, but may be limited in bandwidth by having only a cellular data connection. The user profile may provide compatibility information specifying a lower resolution, and thus smaller data size, format for transmission to terminal device 155. The compatibility information may further comprise a frame rate, such as 24, 30, or 60 frames per second. A higher bandwidth may allow video data to be transmitted at greater resolution and/or higher data rates.

If, at stage 330, computing device 500 determines that the profile does not comprise the content compatibility information, method 300 may advance to stage 335 where computing device 500 may identify the compatibility information. Content compatibility information may be retrieved, for example, from trusted application 160 and/or inferred from model information associated with terminal device 155 and retrieved by the service provider.

From stage 335, method 300 may advance to stage 340 where computing device 500 may identify an available bandwidth. For example, connectivity detection module 145 may perform a bandwidth test to identify a connection speed between terminal device 155 and the service provider. Such a bandwidth time may comprise measuring round trip times for a ping signal and/or performing a data transfer to terminal device 155 and measuring the time taken to transmit a known amount of data.

From stage 340, method 300 may advance to stage 345 where computing device 500 may select a format for the content element appropriate to the requesting device. The format selection may take into account the compatibility information of terminal device 155 and the available bandwidth for transmitting the content element to terminal device 155. For example, terminal device 155 may comprise a video codec compatible with HD and standard definition (SD) video data, may be capable of playing Dolby® 5.1 audio, and may be connected via a 10 Mbps cable modem link to network 150. The selected format may thus comprise a high resolution H.264 video with 5.1 audio. If the connection link had less available bandwidth, the selected format may comprise a lower resolution MPEG-4 video and/or two-channel stereo audio.

From stage 345, or if the profile identified the compatibility information at stage 330, method 300 may advance to stage 350 where computing device 500 may determine whether the selected content is available in the selected format. Consistent with embodiments of the invention, different encoded versions of the same content element may be stored on network content store 115. These different versions may have been previously created for other users' terminal devices having similar format compatibility information and/or may be stored by the service provider. For example, a selected video may be available in HD and SD format, but not a lower resolution QVGA (320×240) format.

If the content is determined not to be available in the selected format at stage 350, method 300 may advance to stage 355 where computing device 500 may transcode the selected content into the selected format. Transcoding is the direct digital-to-digital conversion of one encoding to another. One method of transcoding may comprise decoding the content data into an intermediate format, (e.g., pulse-code modulation for audio and/or YUV color space data for video) in a way that still contains the content of the original, and then encoding the resulting file into the target format. Transcoding may also comprise re-encoding in the same codec format with a changed sample rate and/or image size. The transcoded content element may be stored in network content store 115 for future use and/or discarded after transmission to the requester.

After transcoding the content at stage 355, or if the content was found to be available in the selected format at stage 350, method 300 may advance to stage 360 where computing device 500 may determine whether the provider requires the content to be encrypted. This requirement may comprise a provider rule applicable to all and/or specific elements of content and/or applicable to the specific terminal device or user requesting the content.

If encryption is determined to be required at stage 360, method 365 may advance to stage 365 where computing device 500 may determine whether the requesting terminal device supports encrypted content. For example, terminal device 155 may need to have trusted app 160 installed to decrypt and view the encrypted content element. If terminal device does not support encryption, method 300 may end at stage 380. Consistent with embodiments of the invention, terminal device 155 may display an error message to a user associated with terminal device 155 to inform them of the problem. The service provider may offer the option to install trusted app 160 and continue with retrieving the requested encrypted content. This option may be dependent on the authentication credentials provided at stage 315.

If the terminal device is determined to support encrypted content at stage 365, method 300 may advance to stage 370 where computing device 500 may encrypt the content element. For example, the service provider may apply digital rights management (DRM) to the content element. Consistent with embodiments of the invention, other types of content control and tracking, such as digital watermarking, may be applied to the content element.

After the element is encrypted at stage 370, or if encryption is determined to not be needed at stage 360, method 300 may advance to stage 375 where the requested content element may be transferred to the terminal device in the selected format. The transfer may occur according to a transfer rule established by the service provider and/or the user of terminal device 155, such as a download time window rule associated with the user's profile. For example, the user may establish a rule that transfers over 100 MB may take place between 12:00 AM and 5:00 AM and/or that transfers should only take place when terminal device 155 is connected via an 802.11 wireless network, not a cellular data network. Method 300 may then end at stage 380.

The stages of method 300 described above are intended as non-limiting examples only. Although the method has been described as each being performed by computing device 500, any and/or all of the stages of method 300 may be performed by any and/or all of the modules and elements described in FIGS. 1, 2, 4, and 5. Furthermore, the order of stages is merely an example, and the stages may be performed in any order. For example, the stages indicated as being performed by elements associated with service architecture 100 may be performed by elements associated with customer premises 210.

Figure 4:
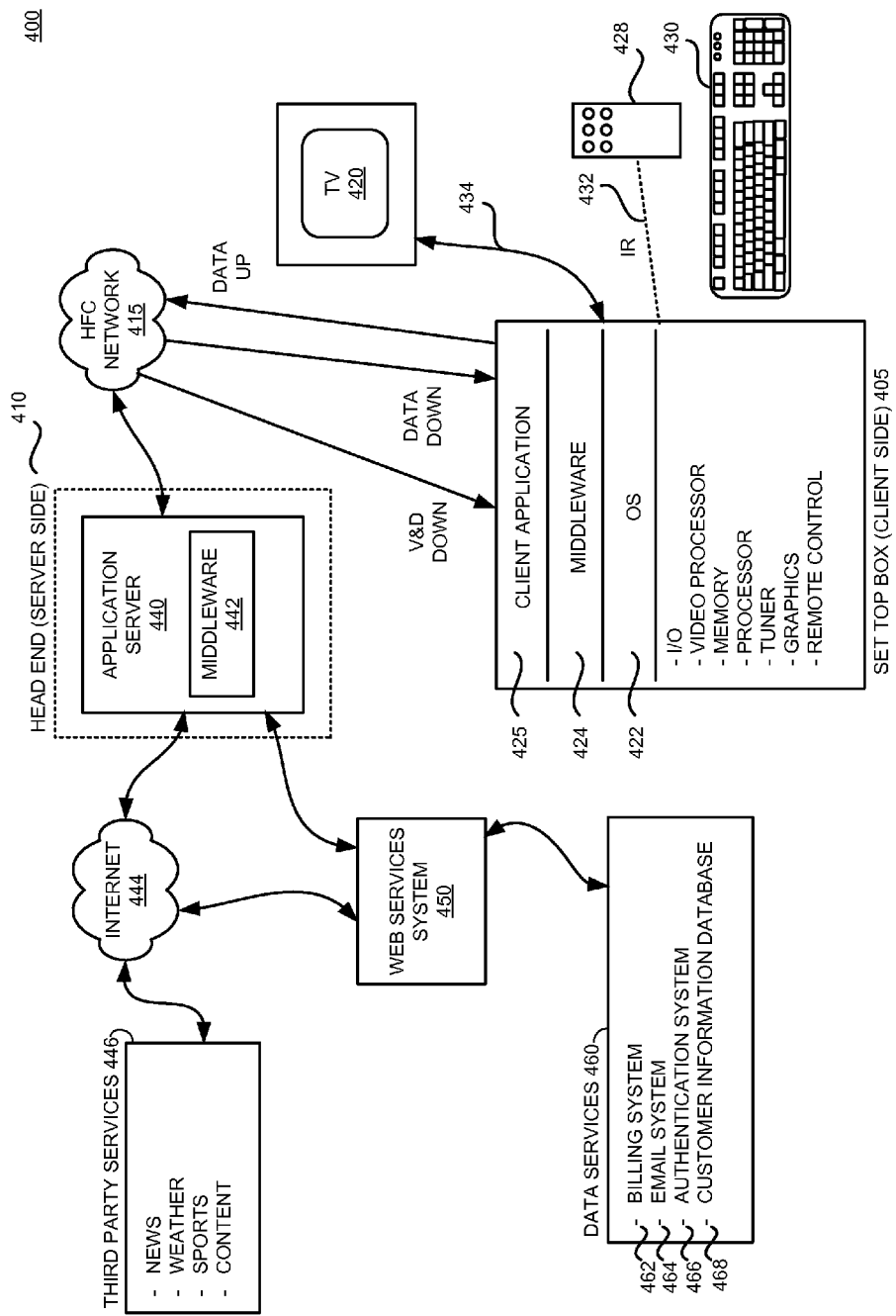
FIG. 4 is a block diagram of a cable television system.

FIG. 4 is a block diagram of a cable television (CATV) system 400 for providing digital and/or analog video programming, information content and interactive television services. These services may be transmitted via a hybrid fiber coax (HFC) network 415 to a television set 420 for consumption by a cable television/services system customer. For example, television set 420 may be located at customer premises 202 as shown in FIG. 2. HFC network 415 may combine both optical fiber and coaxial cable lines. Typically, optical fiber runs from a cable head end 410 to neighborhoods of 500 to 2,000 customers. Coaxial cable runs from the optical fiber feeders to each customer. According to embodiments of the present invention, the functionality of HFC network 415 allows for efficient bidirectional data flow between a client-side set-top box 405 and a server-side application server 440 of the present invention. Set-top box 405 may comprise a terminal device such as terminal device 155 and/or terminal devices 225(A)-225(C).

CATV system 400 may comprise a distributed client-server computing system for providing video and data flow across HFC network 415 between server-side services providers (e.g., cable television/services providers) via head end 410 and a client-side customer via client-side set-top box (STB) 405 functionally connected to a customer receiving device, such as television set 420. CATV systems 400 may provide a variety of services across HFC network 415 including traditional digital and analog video programming, telephone services, high speed Internet access, video-on-demand, and information services.

On the client side of CATV system 400, digital and analog video programming and digital and analog data may be provided to television set 420 via set-top box (STB) 405. Interactive television services that allow a customer to input data to CATV system 400 may likewise be provided by STB 405. As illustrated in FIG. 4, STB 405 may comprise a multipurpose computing device having a computer processor, memory and an input/output mechanism. The input/output mechanism may receive input from server-side processes via HFC network 415 and from customers via input devices such as a remote control device 428 and a keyboard 430. Remote control device 428 and keyboard 430 may communicate with the STB 405 via a suitable communication transport such as an infrared connection 432. STB 405 may also include a video processor for processing and providing digital and analog video signaling to television set 420 via a cable communication transport 434. A multi-channel tuner may be provided for processing video and data to and from STB 405 and head end 410.

STB 405 may also include an operating system 422 for directing the functions of STB 405 in conjunction with a variety of client applications. For example, if a client application 425 requires a news flash from a third-party news source to be displayed on television 420, operating system 422 may cause the graphics functionality and video processor of STB 405, for example, to output the news flash to television 420 at the direction of client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment of the present invention, middleware layer 424 may include a set of application programming interfaces (API) that are exposed to client application 425 and operating system 422 that allow client application 425 to communicate with operating system 422 through common data calls understood via the API set. As described below, a corresponding middleware layer may be included on the server side of CATV system 400 for facilitating communication between server-side application server 440 and client-side STB 405. A middleware layer 442 of server-side application server 440 and middleware layer 424 of client-side STB 405 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 405 passes digital and analog video and data signaling to the television 420 via a one-way communication transport 435. STB 405 may pass digital and analog video and data signaling to the television 420 via communication transport 434. According to an embodiment, bidirectional communication may be accomplished between the STB 405 and the television 420. For example, high-definition multimedia interface (HDMI) ports on the STB 405 and television 420 allow for bidirectional data communications between the devices. STB 405 may receive video and data from the server side of CATV system 400 via HFC network 415 through a video/data downlink and data via a data downlink. STB 405 may transmit data from the client side of CATV system 400 to the server side of CATV system 400 via HFC network 415 via one data uplink. The video/data downlink may comprise an "in band" downlink that allows for digital and analog video and data signaling from the server side of CATV system 400 through HFC network 415 to set-top box 405 for use by STB 405 and for distribution to television set 420. The "in band" signaling space may operate at a variety of frequencies. According to one embodiment, the "in band" signaling space may operate at a frequency between 54 and 1000 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between HFC network 415 and set-top box 405 may comprise "out of band" data links. The "out of band" frequency range generally lies between zero and 54 megahertz. Data flow between client-side set-top box 405 and server-side application server 440 is typically passed through the "out of band" data links. Alternatively, an "in band" data carousel may be positioned in an "in band" channel into which a data feed may be processed from server-side application server 440 through HFC network 415 to client-side STB 405. Operation of data transport between components of CATV system 400, described with reference to FIG. 4, is well known to those skilled in the art.

Data passed between CATV system 400 backend components such as head end 410 and CATV system 400 front end components such as STB 405 may be passed according to the Data Over Cable Service Interface Specification (DOCSIS). DOCSIS provides for a mechanism for data transport over a cable system such as CATV 400, illustrated in FIG. 4. Among other things, DOCSIS allows for the passing of digital communications and Internet connectivity over HFC network 415.

Referring still to FIG. 4, head end 410 of the CATV system 400 may be positioned on the server side of CATV system 400 and may include hardware and software systems responsible for originating and managing content for distributing through HFC network 415 to client-side STB 405 for presentation to customers via television 420. As described above, a number of services may be provided by CATV system 400, including digital and analog video programming, interactive television services, telephone services, video-on-demand services, targeted advertising, and provision of information content.

Application server 440 may comprise a general-purpose computing system operative to assemble and manage data sent to and received from client-side set-top box 405 via HFC network 415. As described above with reference to set-top box 405, application server 440 may comprise middleware layer 442 for processing and preparing data from head end 410 of CATV system 400 for receipt and use by client-side set-top box 405. For example, application server 440 via the middleware layer 442 may obtain data from one and/or more of a plurality of third-party services 446 via network 150 for transmitting to a customer through HFC network 415 and set-top box 405. For example, a weather report from a third-party weather service may be downloaded by application server 440 via internet 444. When application server 440 receives the downloaded weather report, middleware layer 442 may be utilized to format the weather report for receipt and use by set-top box 405. Data obtained and managed by middleware layer 442 of application server 440 may be formatted according to the Extensible Markup Language and may be passed to set-top box 405 through HFC network 415 where the XML-formatted data may be utilized by client application 425 in concert with middleware layer 424, as described above. A variety of third-party services 446 data, including news data, weather data, sports data and other information content may be obtained by application server 440 via distributed computing environments such as internet 444 for provision to customers via HFC network 415 and set-top box 405.

According to embodiments of the present invention, the application server 440 may obtains customer profile data from services provider data services 460 (which may comprise an implementation of profile server 135) for preparing a customer profile that may be utilized by the set-top box 405 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 460 may include a number of services operated by the services provider of CATV system 400 that may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. A customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising data services 460 may operate as separate data services systems, which communicate with a web services system (described below) along a number of different communication paths and according to a number of different communication protocols.

Referring still to FIG. 4, a web services system 450 is illustrated between application server 440 and data services 460. Web services system 450 may serve as a collection point for data requested from each of the disparate data services systems comprising data services 460. When application server 440 requires customer profile data from one or more of data services 460 for preparation or update of a customer profile, application server 440 passes a data query to web services system 450. Web services system 450 formulates a data query to each of the available data services systems for obtaining any available data for a given customer as identified by a set-top box identification associated with the customer. Web services system 450 may serve as an abstraction layer between the various data services systems and application server 440. That is, application server 440 is not required to communicate with the disparate data services systems, nor is application server 440 required to understand the data structures or data types utilized by the disparate data services systems. Web services system 450 may be operative to communicate with each of the disparate data services systems for obtaining necessary customer profile data. The customer profile data obtained by the web services system is assembled and is returned to application server 440 for ultimate processing via middleware layer 442, as described above.

An embodiment consistent with the invention may comprise a system for providing content transcoding. The system may comprise a memory storage and a processing unit coupled to the memory storage. The processing unit may be operative to receive a selection of a content element from a terminal device, identify a content format associated with the terminal device, determine whether the content element is available in the identified content format, transcode the content element from a current content format to the identified content format, and transfer the content element to the terminal device in the identified content format.

Another embodiment consistent with the invention may comprise a system for providing content to a terminal device. The system may comprise a memory storage and a processing unit coupled to the memory storage. The processing unit may be operative to select a content element for transfer to a terminal device, identify a content format associated with the terminal device, identify a bandwidth associated with a connection to the terminal device, prepare the content element for the terminal device according to the identified content format and the bandwidth, and transfer the content element to the terminal device over the connection. The preparation may comprise locating a copy of the content element in the identified content format and/or transcoding the content element from another format into the identified content format.

Yet another embodiment consistent with the invention may comprise a system for providing formatted content. The system may comprise a memory storage and a processing unit coupled to the memory storage. The processing unit may be operative to connect to a content provider, submit an authentication credential to the content provider, select a content element available from the content provider, and determine whether a profile associated with the authentication credential specifies a preferred content format. If so, the processing unit may be operative to determine whether the content element is available in the preferred content format and, if not, transcode the content element to the preferred content format. The processing unit may then be operative to transfer the content element to the terminal device in the preferred content format.

Figure 5:
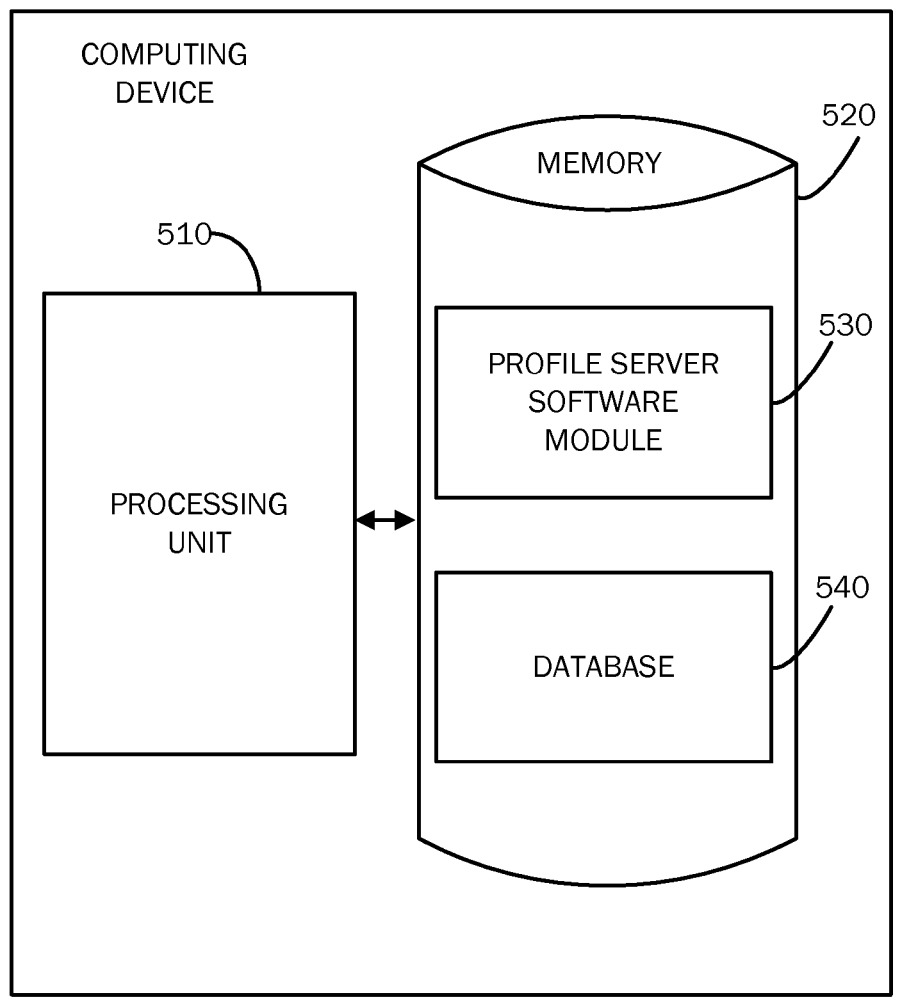
FIG. 5 is a block diagram of a computing device.

FIG. 5 illustrates a computing device 500 as configured to execute a profile server 135 as shown in FIG. 1. Computing device 500 may include a processing unit 510 and a memory unit 520. Memory 520 may include a profile retrieval software module 530 and a profile database 540. While executing on processing unit 510, profile retrieval software module 530 may perform processes for retrieving, updating, and/or transmitting profile information, including, for example, one or more stages included in method 300 described above with respect to FIG. 3. Furthermore, profile retrieval software module 530 may be executed on or reside in any element shown and/or described with respect to FIG. 1. Moreover, any one or more of the stages included in method 300 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

As described herein, methods and systems are provided for allowing network delivery of content. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing encoded content, the method comprising:
   connecting to a content provider from a terminal device;
   submitting an authentication credential associated with the terminal device to the content provider;
   selecting a content element from among a plurality of content elements available from the content provider, wherein the plurality of available content elements is associated with the authentication credential;
   determining whether a profile associated with the authentication credential specifies a preferred content format;
   in response to determining that the profile associated with the authentication credential specifies the preferred content format, determining whether the content element is available in the preferred content format;
   in response to determining that the content element is not available in the preferred content format, transcoding the content element to the preferred content format; and
   transferring the content element to the terminal device in the preferred content format.

2. The method of claim 1, further comprising:
   in response to determining that the profile associated with the authentication credential does not specify the preferred content format, identifying a best content format according to a type of the terminal device and an available bandwidth associated with a connection between the content provider and the terminal device.

3. The method of claim 2, wherein identifying the best content format according to the type of the terminal device comprises identifying a video codec associated with the type of the terminal device.

4. The method of claim 2, wherein identifying the best content format according to the available bandwidth comprises identifying a type of network associated with the connection between the content provider and the terminal device.

5. The method of claim 1, further comprising:
   determining whether the content provider requires the content element in the preferred content format to be encrypted.

6. The method of claim 5, further comprising:
   in response to determining the content provider requires the content element in the preferred content format to be encrypted, encrypting the content element.

7. The method of claim 5, further comprising:
   in response to determining the content provider requires the content element in the preferred content format to be encrypted, determining whether the terminal device supports encryption and, if so, encrypting the content element.

8. A computer readable storage device containing instructions, which when executed by a processing unit, is operative to perform a method for providing encoded content, the method comprising:
   connecting to a content provider from a terminal device;
   submitting an authentication credential associated with the terminal device to the content provider;
   selecting a content element from among a plurality of content elements available from the content provider, wherein the plurality of available content elements is associated with the authentication credential;
   determining whether a profile associated with the authentication credential specifies a preferred content format;
   in response to determining that the profile associated with the authentication credential specifies the preferred content format, determining whether the content element is available in the preferred content format;
   in response to determining that the content element is not available in the preferred content format, transcoding the content element to the preferred content format; and
   transferring the content element to the terminal device in the preferred content format.

9. The computer readable storage device of claim 8, further comprising:
   in response to determining that the profile associated with the authentication credential does not specify the preferred content format, identifying a best content format according to a type of the terminal device and an available bandwidth associated with a connection between the content provider and the terminal device.

10. The computer readable storage device of claim 9, wherein identifying the best content format according to the type of the terminal device comprises identifying a video codec associated with the type of the terminal device.

11. The computer readable storage device of claim 9, wherein identifying the best content format according to the available bandwidth comprises identifying a type of network associated with the connection between the content provider and the terminal device.

12. The computer readable storage device of claim 8, further comprising:
determining whether the content provider requires the content element in the preferred content format to be encrypted.

13. The computer readable storage device of claim 12, further comprising:
in response to determining the content provider requires the content element in the preferred content format to be encrypted, encrypting the content element.

14. The computer readable storage device of claim 12, further comprising:
in response to determining the content provider requires the content element in the preferred content format to be encrypted, determining whether the terminal device supports encryption and, if so, encrypting the content element.

15. A system for providing encoded content comprising:
a memory; and
a processing unit, which when coupled to the memory, is operative to:
connect to a content provider from a terminal device;
submit an authentication credential associated with the terminal device to the content provider;
select a content element from among a plurality of content elements available from the content provider, wherein the plurality of available content elements is associated with the authentication credential;
determine whether a profile associated with the authentication credential specifies a preferred content format;
in response to determining that the profile associated with the authentication credential specifies the preferred content format, determine whether the content element is available in the preferred content format;
in response to determining that the content element is not available in the preferred content format, transcode the content element to the preferred content format; and
transfer the content element to the terminal device in the preferred content format.

16. The system of claim 15, further being operative to:
in response to determining that the profile associated with the authentication credential does not specify the preferred content format, identify a best content format according to a type of the terminal device and an available bandwidth associated with a connection between the content provider and the terminal device.

17. The system of claim 16, wherein to identify the best content format according to the type of the terminal device comprises to identify a video codec associated with the type of the terminal device.

18. The system of claim 16, wherein to identify the best content format according to the available bandwidth comprises to identify a type of network associated with the connection between the content provider and the terminal device.

19. The system of claim 15, further being operative to:
determine whether the content provider requires the content element in the preferred content format to be encrypted.

20. The system of claim 19, further being operative to:
in response to determining the content provider requires the content element in the preferred content format to be encrypted, encrypt the content element.

* * * * *